US012741823B2

(12) United States Patent
Li

(10) Patent No.: US 12,741,823 B2
(45) Date of Patent: Sep. 22, 2026

(54) PUSH-BACK STORAGE SYSTEMS

(71) Applicant: La compagnie d'organisation de systèmes de manutention el d'entreposage (COSME) Inc., Montreal (CA)

(72) Inventor: Marc Li, Montreal (CA)

(73) Assignee: THE ECONO-RACK GROUP (2015) INC., Mississauga (CA)

(*) Notice: Subject to any disclaimer, the term of this patent is extended or adjusted under 35 U.S.C. 154(b) by 886 days.

(21) Appl. No.: 18/088,050

(22) Filed: Dec. 23, 2022

(65) Prior Publication Data

US 2024/0208737 A1 Jun. 27, 2024

Related U.S. Application Data

(60) Provisional application No. 63/293,426, filed on Dec. 23, 2021.

(51) Int. Cl.

| | |
|---|---|
| ***B65G 45/10*** | (2006.01) |
| ***B65G 35/06*** | (2006.01) |
| ***B65G 43/08*** | (2006.01) |
| ***B65G 45/12*** | (2006.01) |
| ***B65G 45/14*** | (2006.01) |

(Continued)

(52) U.S. Cl.

CPC ............. *B65G 45/10* (2013.01); *B65G 35/06* (2013.01); *B65G 43/08* (2013.01); *B65G 45/12* (2013.01); *B65G 45/14* (2013.01); *B65G 45/18* (2013.01); *B65G 45/22* (2013.01); *B65G 45/24* (2013.01); *B65G 1/08* (2013.01); *B65G 2203/0283* (2013.01); *B65G 2203/042* (2013.01);

(Continued)

(58) Field of Classification Search

CPC .... E01H 8/00; E01H 8/10; E01H 8/04; E01H 8/06; B65G 45/10; B65G 45/12; B65G 45/14; B65G 45/18; B65G 45/22; B65G 45/24; B65G 1/08

USPC ........................... 104/279; 291/42; 15/54, 55

See application file for complete search history.

(56) References Cited

U.S. PATENT DOCUMENTS 446,326 A * 2/1891 Chambers ............. E01B 27/026 15/55
626,039 A * 5/1899 Robertson ............. E01B 27/026 15/55

(Continued)

FOREIGN PATENT DOCUMENTS

CN 109572727 A * 4/2019 ............. B61D 15/12
CN 111778913 A * 10/2020 ............. E01H 8/105

(Continued)

*Primary Examiner* — S. Joseph Morano
*Assistant Examiner* — James William Jones
(74) *Attorney, Agent, or Firm* — Smart & Biggar LP

(57) ABSTRACT

The disclosure relates to an indicator assembly for use in push-back storage systems, comprising a rail having an indicator portion comprising an opening therethrough and an indicator mounted at the indicator portion. When a cart wheel rollingly engages the indicator portion, the indicator is triggered thereby providing an indication of passage of the wheel over the indicator portion. The disclosure also relates to a rail cleaning assembly comprising a frame configured to be mounted to a cart wheel that rollingly engages a rail along the length of the rail; and at least one cleaning element positioned to engage the rail, thereby removing debris accumulated on the rail as the wheel rollingly engages the rail.

14 Claims, 15 Drawing Sheets

(51) Int. Cl.

| | |
|---|---|
| ***B65G 45/18*** | (2006.01) |
| ***B65G 45/22*** | (2006.01) |
| ***B65G 45/24*** | (2006.01) |
| *B65G 1/08* | (2006.01) |
| *E01H 8/00* | (2006.01) |
| *E01H 8/04* | (2006.01) |
| *E01H 8/06* | (2006.01) |
| *E01H 8/10* | (2006.01) |

(52) U.S. Cl.

CPC .................. *E01H 8/00* (2013.01); *E01H 8/04* (2013.01); *E01H 8/06* (2013.01); *E01H 8/10* (2013.01)

(56) References Cited

U.S. PATENT DOCUMENTS

| | | | | | |
|---|---|---|---|---|---|
| 5,482,422 | A * | 1/1996 | Hammond | B65G 1/026 | 211/151 |
| 5,524,776 | A * | 6/1996 | Hall | B65G 1/026 | 211/151 |
| 5,671,838 | A * | 9/1997 | Bowman | B65G 45/18 | 198/496 |
| 6,851,562 | B2 * | 2/2005 | Gorniak | B65G 1/026 | 211/151 |
| 7,114,904 | B2 * | 10/2006 | Charbonneau | B65G 1/026 | 211/59.2 |

FOREIGN PATENT DOCUMENTS

| | | | | |
|---|---|---|---|---|
| CN | 112523155 | A * | 3/2021 | E01H 8/02 |
| FR | 2914611 | A1 * | 10/2008 | B61F 19/04 |
| KR | 20140080074 | A * | 6/2014 | B66C 9/00 |

* cited by examiner

Fig. 23A
Fig. 23B
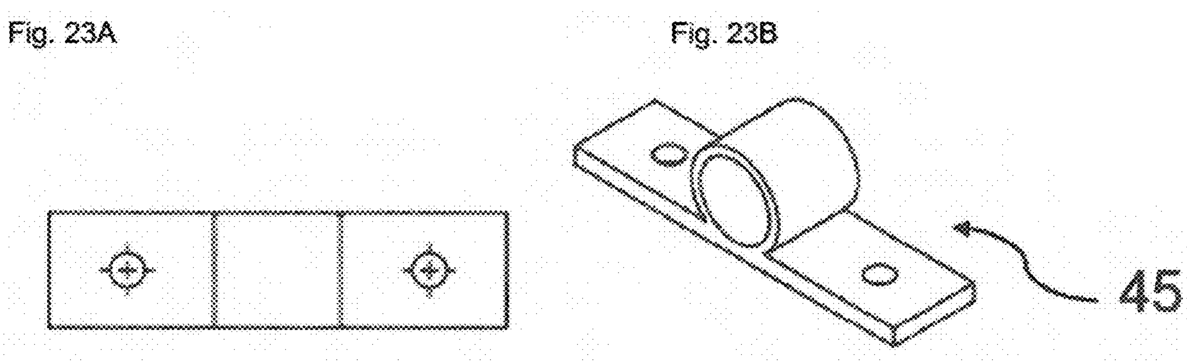
Fig. 23C
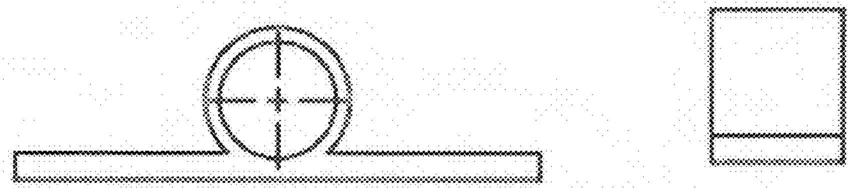
Fig. 23 D
Fig. 24
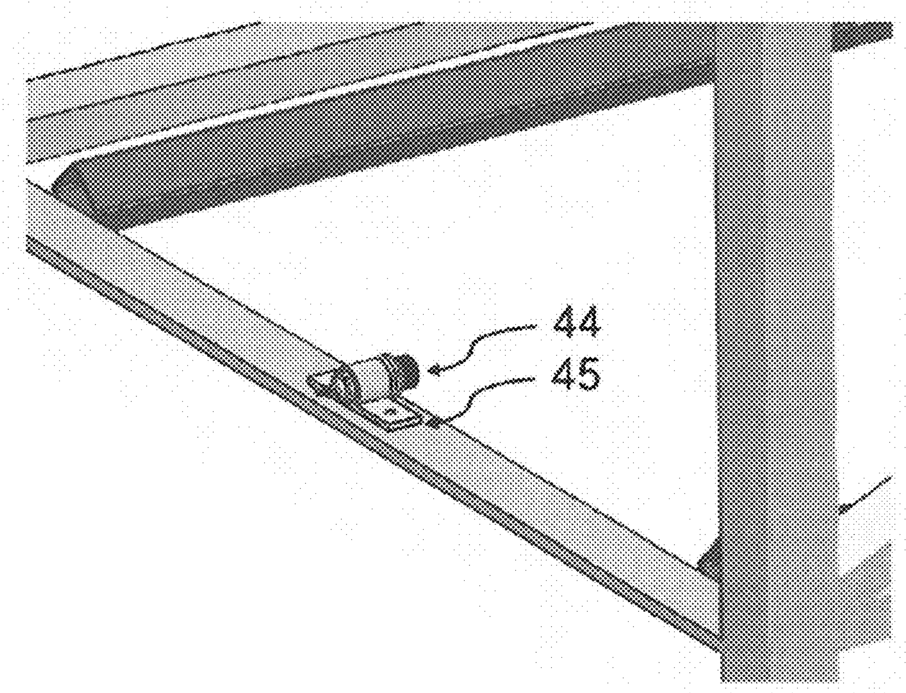

50
Placing order
Item
Visual confirmation of item in warehouse
Assess quantity of item
If running low on quantity, must order from supplier
If none left, order from supplier and delay order
Proceed with order
Process order
Ship

60

PUSH-BACK STORAGE SYSTEMS

FIELD

This disclosure generally relates to storage systems, and more particularly to push-back storage systems comprising a plurality of storing lanes each having rolling carts mounted on rails within the storing lane, as well as indicator assemblies and rail cleaning assemblies integrated therein.

BACKGROUND

Push-back storage systems have been developed to optimize storage of palletized articles. These push-back storage systems have a series of elongated storing lanes, the frontmost end of each lane defining a forklift access opening. Each lane comprises a number of frontwardly inclined pairs of rails and a number of carts each engaging a corresponding pair of rails. The pairs of rails are arranged in the following manner: the first or innermost pair of rails is the narrowest, and also vertically projects above the level of the other pairs of rails. The second and following pairs of rails are gradually wider and vertically lower than each preceding pair of rails. Each pair of rails is engaged by a corresponding cart which may roll therealong between a frontmost position near the forklift access opening, and a rearmost position away from the forklift access opening. The first cart engaging the innermost pair of rails is the narrowest, and the other carts are gradually wider than the preceding cart. A front stop member prevents the carts from rolling along the frontwardly downwardly inclined rails beyond the forklift access opening.

To store a first article-loaded pallet on such a storage system, the forklift places through the forklift access opening the article-loaded pallet over the vertically topmost and narrower cart. The first pallet is prevented from rolling beyond the forklift access opening under its own weight, by the abutment of its cart against the front stop member. Then, after having picked-up a second item-loaded pallet, the forklift horizontally pushes this second pallet against the first pallet, the latter being pushed back, with its cart rearwardly rolling along its corresponding first pair of rails against the rearwardly upward inclination of the rails, until the second topmost cart is cleared to allow the second pallet to be placed thereon. The second pallet, located near the forklift access opening, now abuts against the front stop member under its own weight and due to the frontwardly inclined rails, and the first pallet abuts against the second pallet.

This process can then be repeated until all carts are full: each new pallet comes to rest on the topmost available cart, after the preceding pallet-loaded carts have been pushed back up along the inclined rails.

To unload the pallets from the storage system, the pallets are recuperated by the forklift truck in a last-in first-out order. Thus, the frontmost article-loaded pallet is first retrieved, and by doing so, all the other stacked pallets are allowed to advance towards the forklift access opening, allowing a new frontmost pallet to be available at the storing lane forklift access opening. This advancement of the pallets towards the front end of the storage rack lane occurs automatically under their own weight by the rolling engagement of their respective carts on the inclined rails.

There remains however a need for improved push-back storage systems that provide information on inventory, storage or proper alignment or positioning of carts. Also, as rails may accumulate dust and debris at their surface, particularly rails with flat surfaces, there is a need to remove such debris which may hinder or cause misalignment of the carts and/or premature wearing of wheels.

SUMMARY

In an aspect, the present disclosure relates to an indicator assembly for use in a push-back storage system, comprising:

- a rail having an upper rail surface, the upper rail surface configured for a cart wheel to rollingly engage thereon, the rail further having an indicator portion, the indicator portion comprising an opening therethrough; and
- an indicator mounted below the upper rail surface of the indicator portion;
- wherein when the cart wheel rollingly engages the indicator portion, the indicator is triggered thereby providing an indication of passage of the cart wheel over the indicator portion.

In an embodiment, the indicator assembly further comprises a support base for securing the indicator at the indicator portion.

In an embodiment, the rail is a hollow rail and the indicator is mounted inside the rail.

In an embodiment, the rail has a diamond-shaped cross-section and comprises four elongated side walls linked to each other along their edge.

In an embodiment, the cart wheel rollingly engages upper rail surfaces of the two upper side walls of the rail.

In an embodiment, the support base rests on the inner surfaces of the two lower side walls of the rail.

In an embodiment, the support base is triangle-shaped, two support base sides resting on the two lower side walls of the rail and a third side defining a surface for supporting the indicator.

In an embodiment, the support base further comprises a pair of arms extending upwardly from the support base surface, for securing therebetween the indicator.

In an embodiment, the cover extends beyond the upper rail surface such that when the cart wheel rollingly engages the indicator portion, the cover is pressed down and activates the indicator.

In an embodiment, the indicator is a limit switch.

In an embodiment, when the cover activates or engages the limit switch, an actuator portion of the limit switch is moved, causing an electrical connection to be made, thereby providing the indication of passage of the wheel over the indicator portion.

In an embodiment, the assembly comprises a plurality of indicator portions and corresponding indicators and covers.

In another aspect, the present disclosure relates to a push-back storage system, comprising:

- an elongated storing lane defining opposite front and rear ends;
- at least one pair of spaced-apart parallel elongated rails extending between said front and rear ends of said storing lane and being inclined downwardly from said rear end towards said front end;
- at least one cart rollably carried by said pair of rails and rollable along said pair of rails between said storing lane front and rear ends, said cart comprising a load-bearing frame rollably carrying a number of wheels each engaging a corresponding one of said rails; and
- an indicator mounted below an upper rail surface of an indicator portion of a rail of the at least at least one pair of rails, wherein when a cart wheel rollingly engages the indicator portion, the indicator is triggered thereby providing an indication of passage of the cart wheel over the indicator portion.

In an embodiment, the system further comprises a support base for securing the indicator at the indicator portion.

In an embodiment, the rails are hollow rails and the indicator is mounted inside one of the rails.

In an embodiment, the rails have a diamond-shaped cross-section and comprise four elongated side walls linked to each other along their edge.

In an embodiment, the cart wheel rollingly engages upper rail surfaces of the two upper side walls of the rail.

In an embodiment, the support base rests on the inner surfaces of the two lower side walls of the rail.

In an embodiment, the support base is triangle-shaped, two support base sides resting on the two lower side walls of the rail and a third side defining a surface for supporting the indicator.

In an embodiment, the support base further comprises a pair of arms extending upwardly from the support base surface, for securing therebetween the indicator.

In an embodiment, the system further comprises a cover fitted within the opening of the indicator portion, optionally wherein the cover extends beyond the upper rail surface such that when the cart wheel rollingly engages the indicator portion, the cover is pressed down and activates the indicator.

In an embodiment, the indicator is a limit switch.

In an embodiment, when the cover activates the limit switch, an actuator portion of the limit switch is moved, causing an electrical connection to be made, thereby providing the indication of passage of the wheel over the indicator portion In an embodiment, the assembly comprises a plurality of indicator portions and corresponding indicators and covers.

Another aspect disclosed herein is a rail cleaning assembly for use in a push-back storage system, comprising:

- a frame configured to be mounted to a cart wheel that rollingly engages a rail along the length of the rail; and
- at least one cleaning element, the at least one cleaning element secured to the frame and positioned to engage the rail, thereby removing debris accumulated on the rail as the wheel rollingly engages the rail.

In an embodiment, the at least one cleaning element comprises a base and a cleaning portion, the base being secured to the frame and the extremity extending downwardly and positioned to engage the rail.

In an embodiment, the at least one cleaning element is configured to be positioned in front or behind the wheel.

In an embodiment, the assembly comprises a pair of cleaning element, a first cleaning element configured to be positioned in front of the wheel and a second cleaning element configured to be positioned behind the wheel.

In an embodiment, the frame is L-shaped.

In an embodiment, a first arm of the frame extends downwardly and a lower end of the first arm is configured to be mounted to the cart wheel.

In an embodiment, a second arm of the frame extends perpendicularly from the upper end of the first arm and is configured to extend over the cart wheel.

In an embodiment, the second arm of the frame comprises a front end and a back end and at least one of the front and back ends are configured to receive the base.

In an embodiment, the front and/or back ends comprise a respective slot for insertion therein of the base.

In an embodiment, the at least one cleaning element is a at least one brush. In an embodiment, the brush is a nylon brush. In an embodiment, the brush is a horsehair brush. In an embodiment, the at least one cleaning element is at least one duster.

In an embodiment, the frame is configured to be mounted to a wheel cart axle.

Another aspect of the present disclosure includes a push-back storage system, comprising:

- an elongated storing lane defining opposite front and rear ends;
- at least one pair of spaced-apart parallel elongated rails extending between said front and rear ends of said storing lane and being inclined downwardly from said rear end towards said front end;
- at least one cart rollably carried by said pair of rails and rollable along said pair of rails between said storing lane front and rear ends, said cart comprising a load-bearing frame rollably carrying a number of wheels each engaging a corresponding one of said rails; and
- a rail cleaning assembly, comprising:
  - a frame mounted on one of the cart wheels;
  - at least one cleaning element, the at least one cleaning element secured to the frame and positioned to engage a rail of the at least at least one pair of rails, thereby removing debris accumulated on the surface of the rail as the wheel rollingly engages the rail.

In an embodiment, the at least one cleaning element comprises a base and a cleaning portion, the base being secured to the frame and the extremity extending downwardly and positioned to engage the rail.

In an embodiment, the system comprises a plurality of rail cleaning assemblies, each of the rail cleaning assemblies mounted to a different cart wheel.

In an embodiment, the system comprises a plurality of rail cleaning assemblies, each of the rail cleaning assemblies mounted to a different cart wheel.

In an embodiment, the at least one cleaning element is configured to be positioned in front and/or behind the wheel.

In an embodiment, the system comprises a pair of cleaning elements, a first cleaning element configured to be positioned in front of the wheel and a second cleaning element configured to be positioned behind the wheel.

In an embodiment, the frame is L-shaped.

In an embodiment, a first arm of the frame extends downwardly and a lower end of the first arm is configured to be mounted to the cart wheel.

In an embodiment, a second arm of the frame extends perpendicularly from the upper end of the first arm and is configured to extend over the cart wheel.

In an embodiment, the second arm of the frame comprises a front end and a back end and at least one of the front and back ends are configured to receive the base.

In an embodiment, the front and/or back ends comprise a respective slot for insertion therein of the base.

In an embodiment, the at least one cleaning element is brush, optionally a nylon or horsehair brush, or a duster.

In an embodiment, the frame is mounted to a wheel cart axle.

In an embodiment, the system further comprises the rail cleaning assembly herein described.

In an embodiment, the system further comprises one or more sensors.

In an embodiment, the one or more sensors is a proximity sensor, an infrared (IR) sensor, a color sensor, a force sensor or a contact sensor.

In an embodiment, the one or more sensor is mounted on the rail, below the rail, optionally below the upper surface of the indicator portion of the rail, and/or on a side wall extending from the rail.

In an embodiment, the system herein disclosed is for improving warehouse functionality, inventory tracking, picking, receiving and/or storing of goods.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 23A, 23B, 23C and 23D are top, perspective, side and front views of the proximity sensor bracket of FIG. 21;

FIG. 24 is a perspective view of the proximity sensor of FIG. 21;

DETAILED DESCRIPTION

Figure 1:
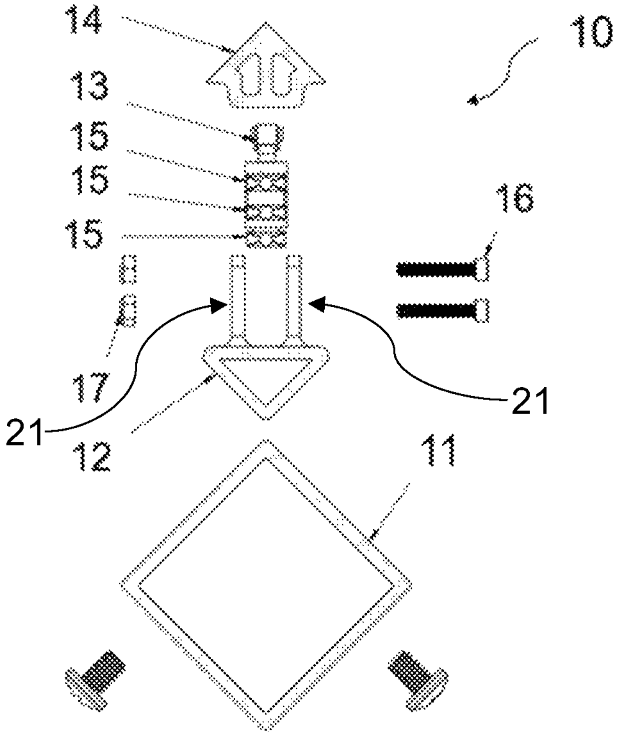
FIG. 1 is an exploded front view of an example indicator assembly.

Various devices and methods are described below to provide an example of at least one embodiment of the claimed subject matter. No embodiment described below limits any claimed subject matter and any claimed subject matter may cover devices and methods that differ from those described below. The claimed subject matter is not limited to devices and methods having all of the features of any one device or method described below or to features common to multiple or all of the devices and methods described below. It is possible that a device or method described below is not an embodiment of any claimed subject matter. Any subject matter that is disclosed in a device or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as a deviation of at least ±5% or at least ±10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Referring to FIGS. 1 to 6, the example indicator assembly 10 in accordance with an embodiment comprises a rail 11, an indicator 13, a support base 12 and a cover 14. The rail 11 is preferably a hollow rail that has a diamond-shaped cross-section, similar to the rail of the push-back storage system described in U.S. Pat. No. 7,114,904, herein incorporated by reference in its entirety. The rail comprises four elongated side walls linked to each other along their edge. The rail has an upper rail surface on which a cart wheel rollingly engages. It will be understood that other rail configurations which can support or house an indicator and allow wheels to rollingly engage are contemplated.

While the expression "engage" or "engages" is used to qualify how a wheel of a cart interacts with the rail, it will be understood that engages means that the wheel rolls along and is guided by the rail, whatever the shape of the rail may be, and whatever configuration the wheel may have on its outer periphery.

Figure 2:
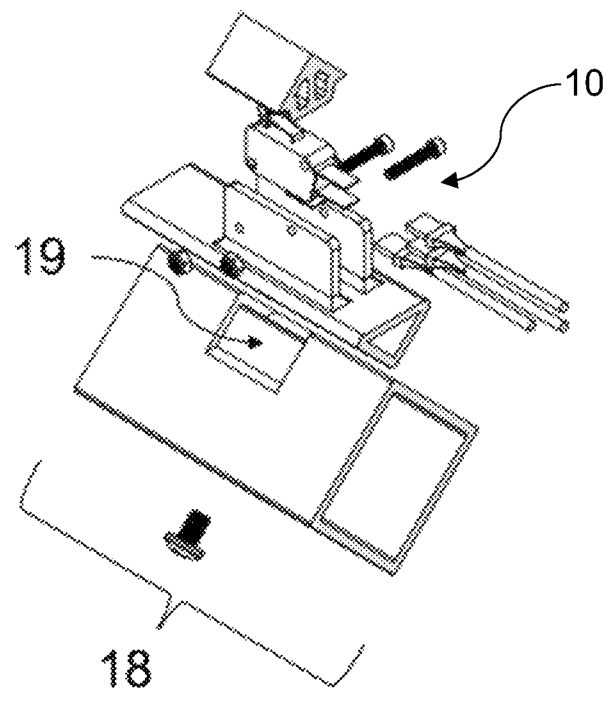
FIG. 2 is an exploded perspective view of the indicator assembly of FIG. 1.
Figure 3:
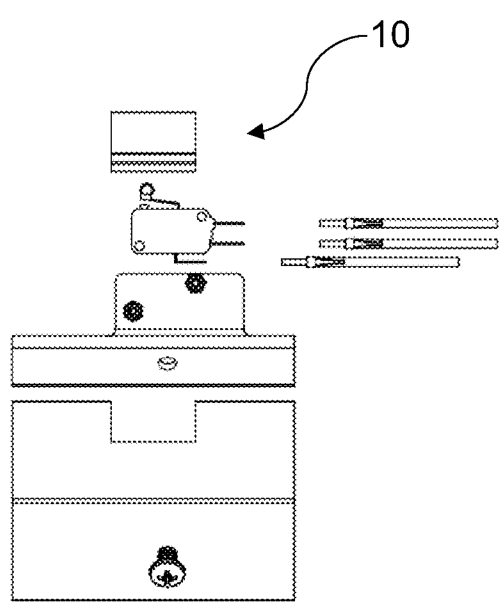
FIG. 3 is an exploded side view of the indicator assembly of FIG. 1.

As best seen in FIG. 2, the rail 11 also includes an indicator portion 18 that comprises an opening 19. The shape and size of the opening may vary and preferably the shape of the cover will be similar to that of the opening. Preferably, any gap between the cover and opening is no greater than 5 mm or more preferably 2 mm, in order to reduce the amount of debris that may fall into the rail body.

Figure 4:
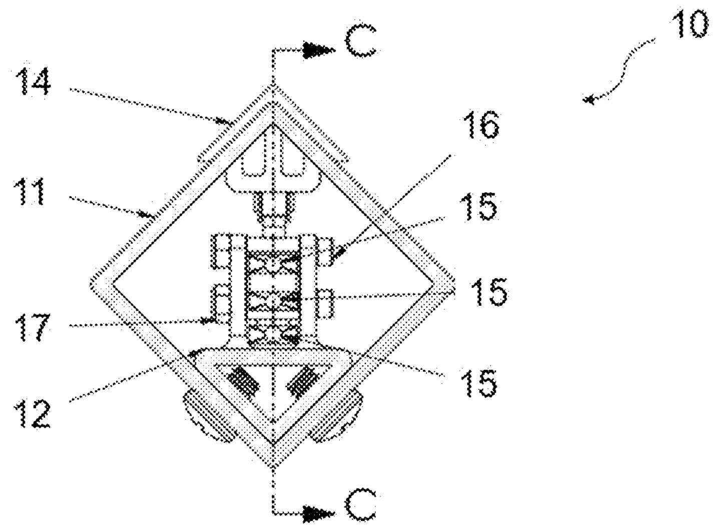
FIG. 4 is a front elevation view of the indicator assembly of FIG. 1.
Figure 5:
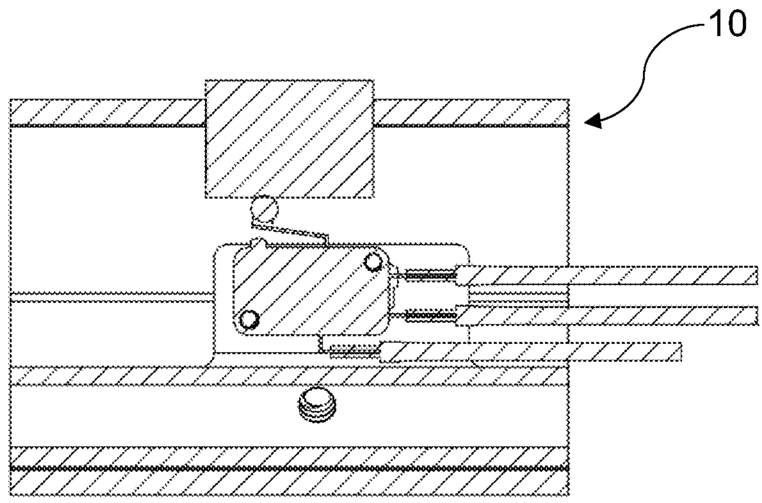
FIG. 5 is a C-C cross-section view of the indicator assembly of FIG. 4.
Figure 6:
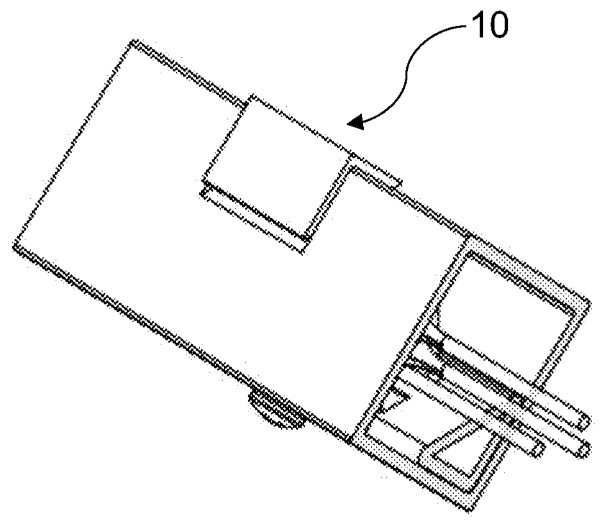
FIG. 6 is a perspective view of the indicator assembly of FIG. 1.
Figure 7:
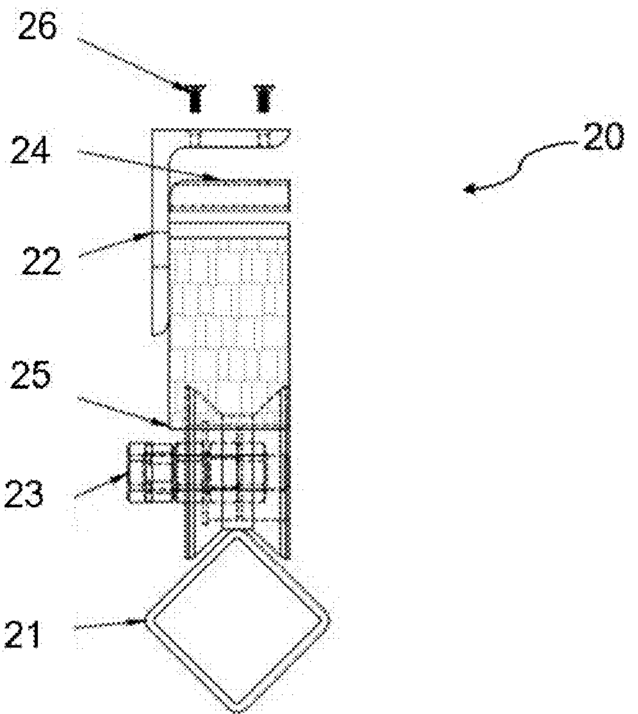
FIG. 7 is an exploded front view of an example brush assembly.
Figure 8:
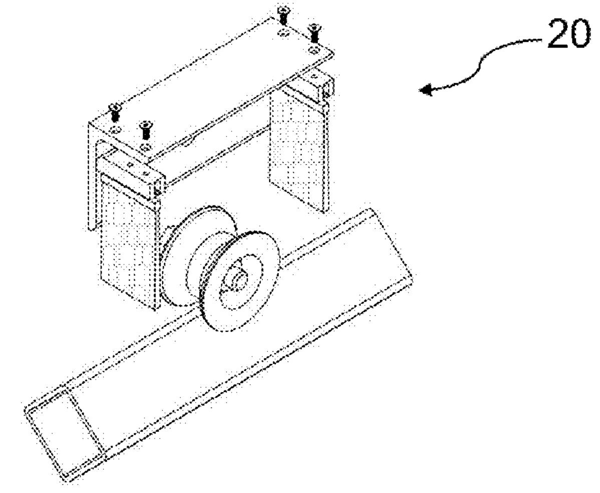
FIG. 8 is an exploded perspective view of the brush assembly of FIG. 7.
Figure 9:
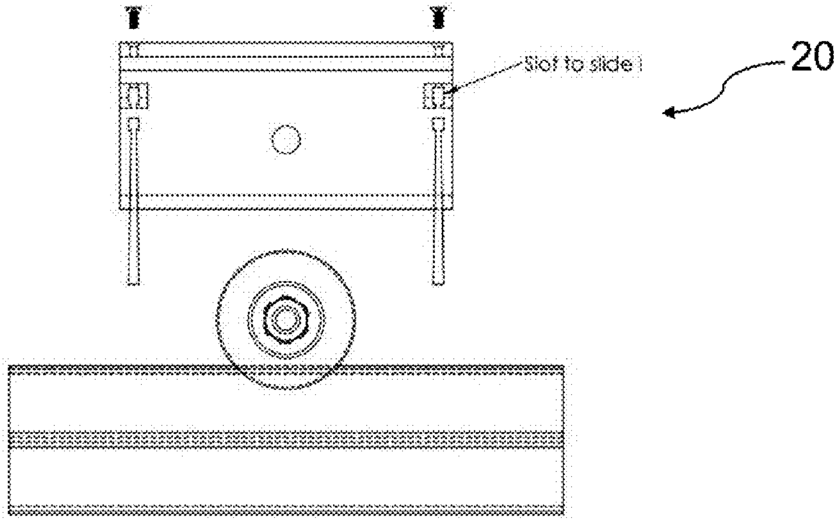
FIG. 9 is an exploded side view of the brush assembly of FIG. 7.
Figure 10:
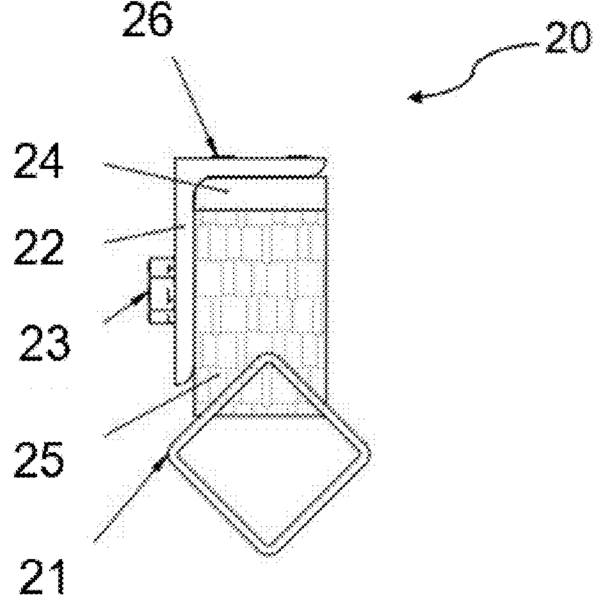
FIG. 10 is a front elevation view of the brush assembly of FIG. 7.
Figure 11:
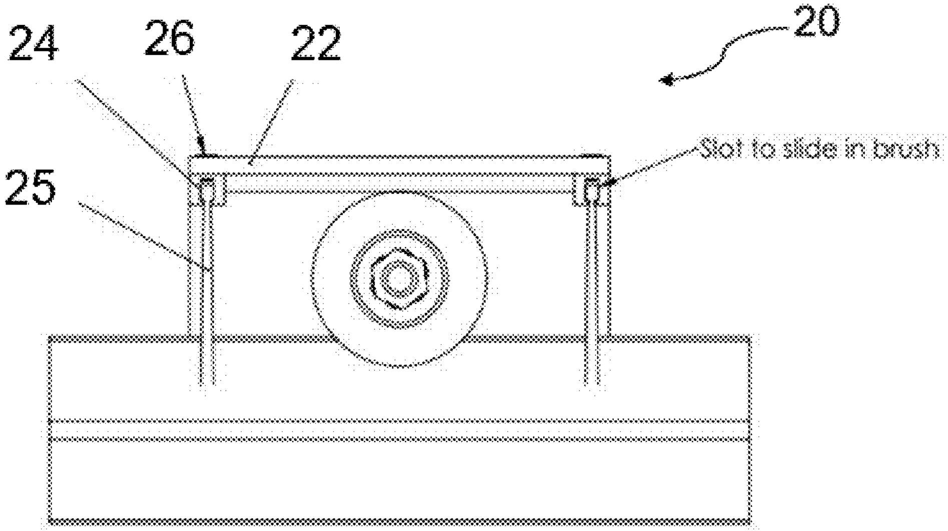
FIG. 11 is a side view of the brush assembly of FIG. 7.
Figure 12:
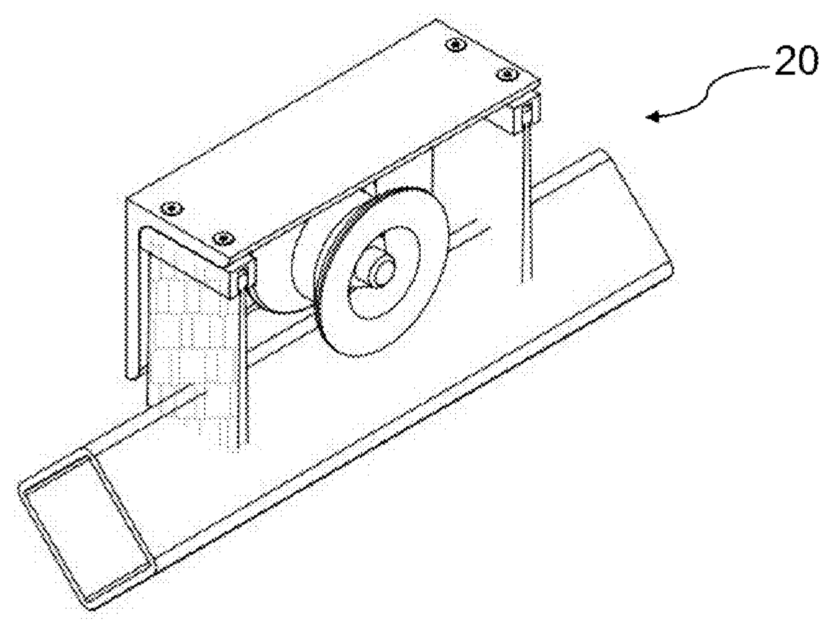
FIG. 12 is a perspective view of the brush assembly of FIG. 7.
Figure 13:
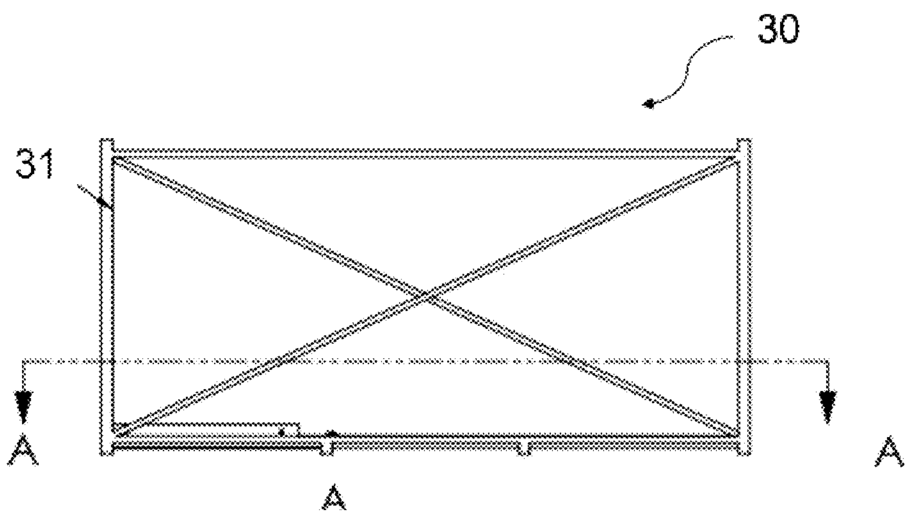
FIG. 13 is a side view of an example push-back storage system with reflective optical sensor mounted on a pair of opposing rails.
Figure 14:
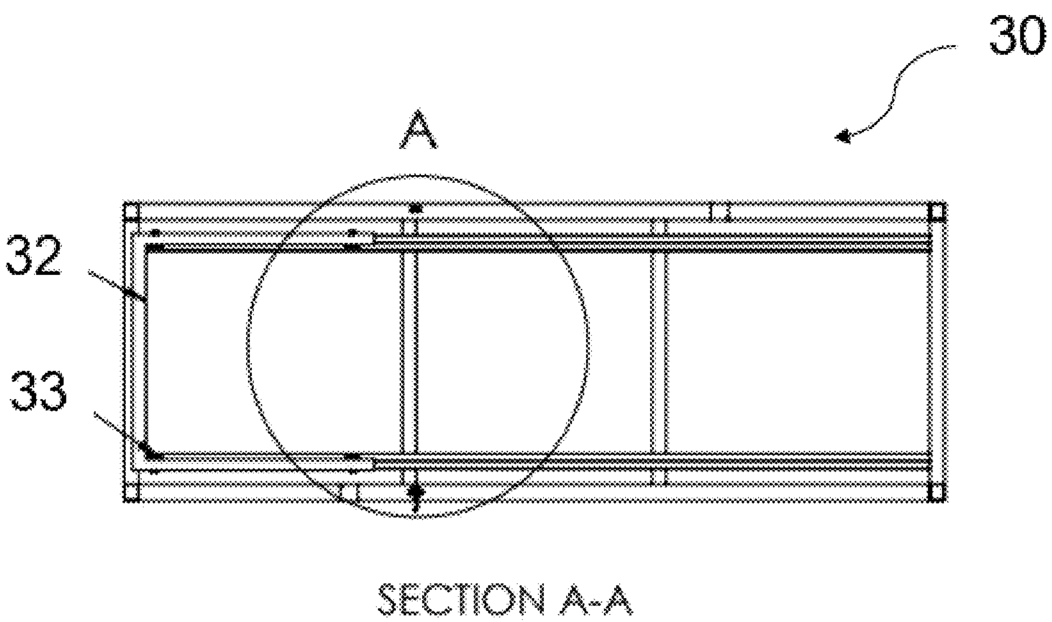
FIG. 14 is a A-A cross-section or top view of the push-back storage system of FIG. 13.
Figure 15:
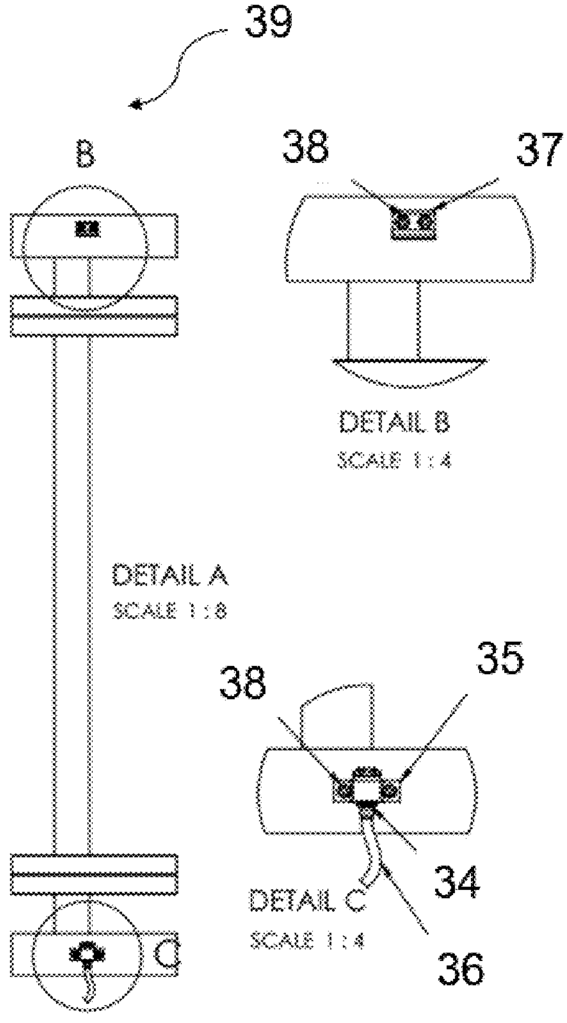
FIG. 15 is a close up of the reflective optical sensor mounted in the push-back storage system of FIG. 13.
Figure 16:
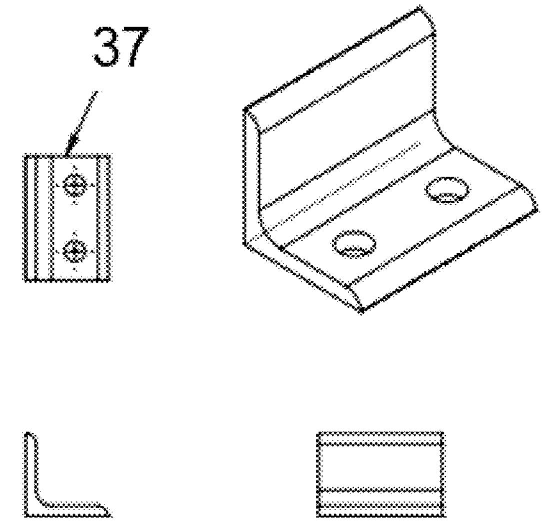
FIG. 16 is an exploded view of the reflector portion of the reflective optical sensor of FIG. 15.
Figure 17:
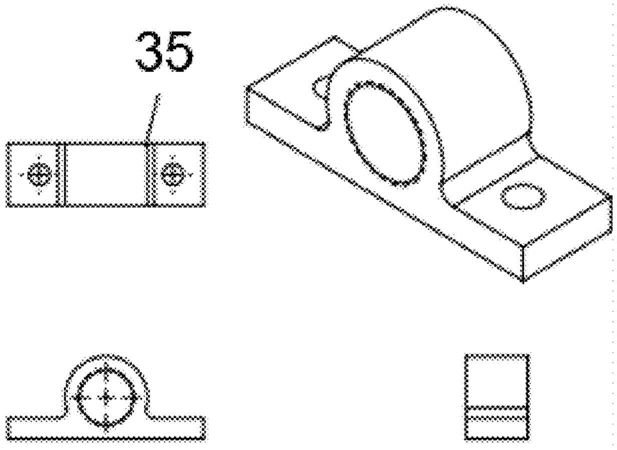
FIG. 17 is an exploded view of the sensor portion of the reflective optical sensor of FIG. 15.
Figure 18:
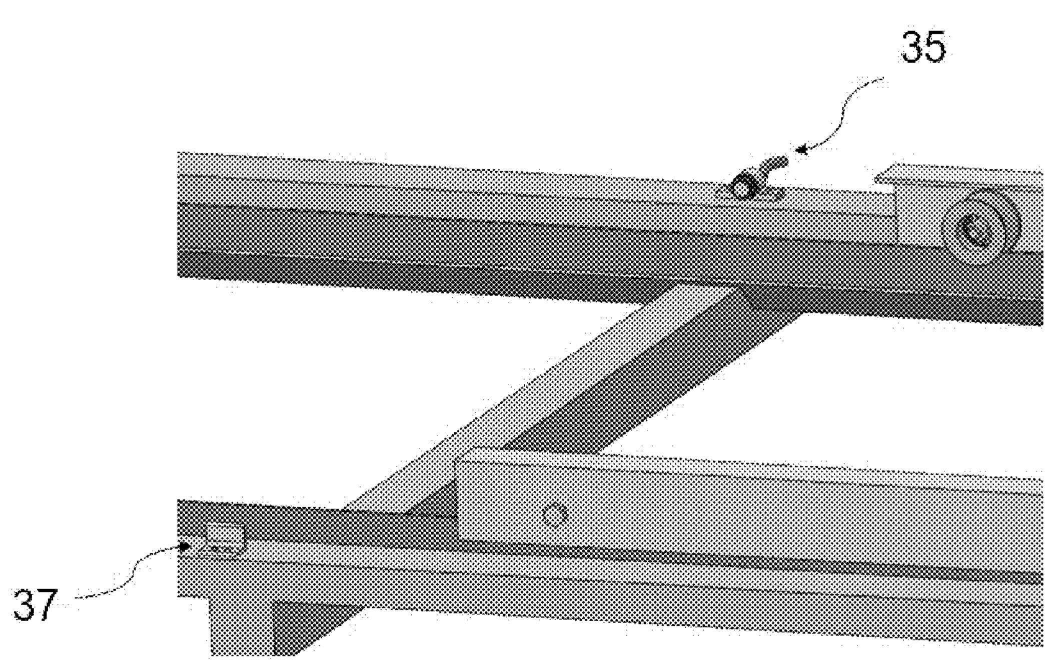
FIG. 18 is a perspective close up view of the reflective optical sensor of FIG. 15.
Figure 19:
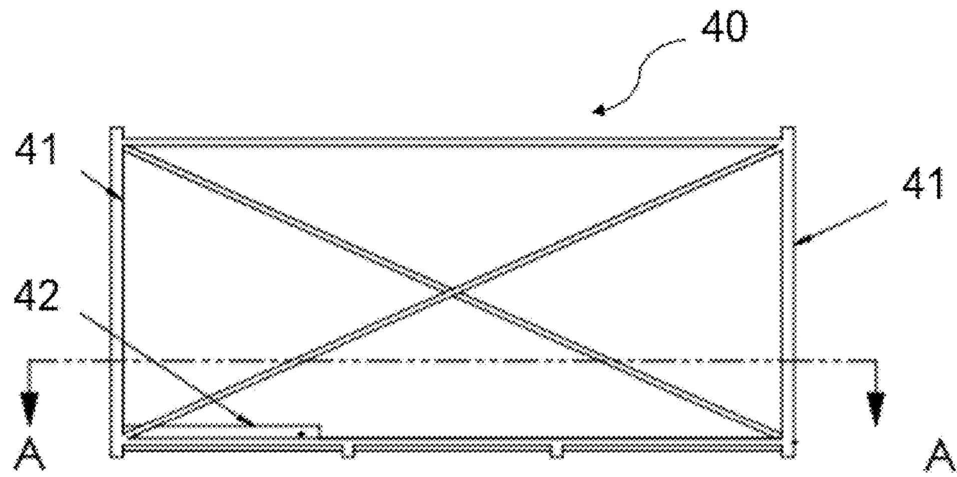
FIG. 19 is a side view of an example push-back storage system with a proximity sensor mounted at the rear end of the storing lane.
Figure 20:
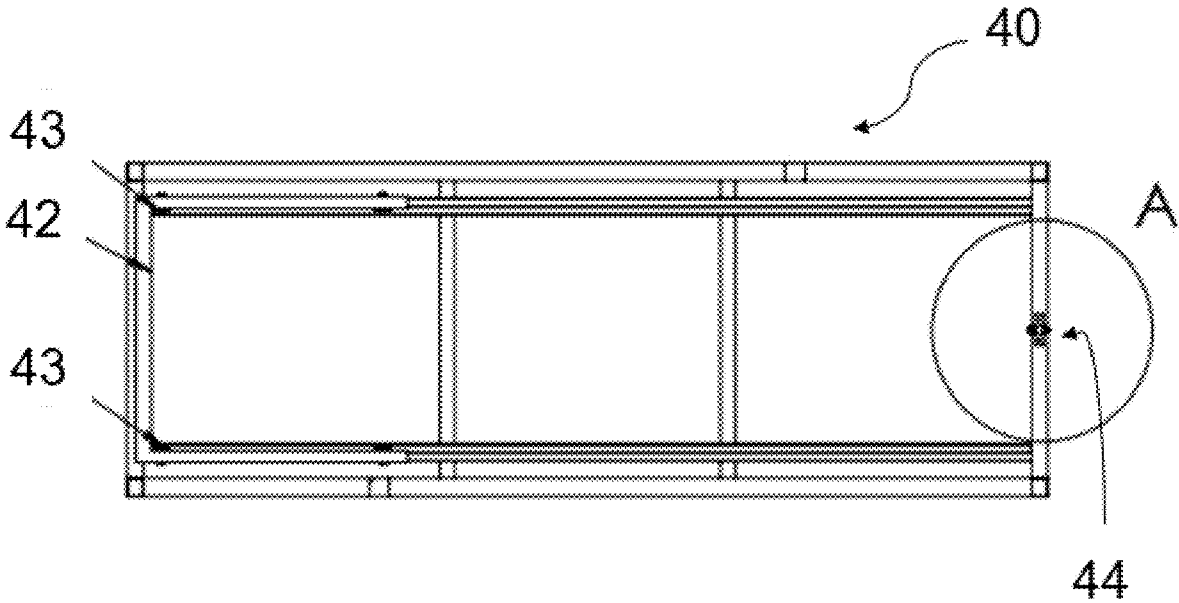
FIG. 20 is a A-A cross section view of the push-back storage of FIG. 19.
Figure 21:
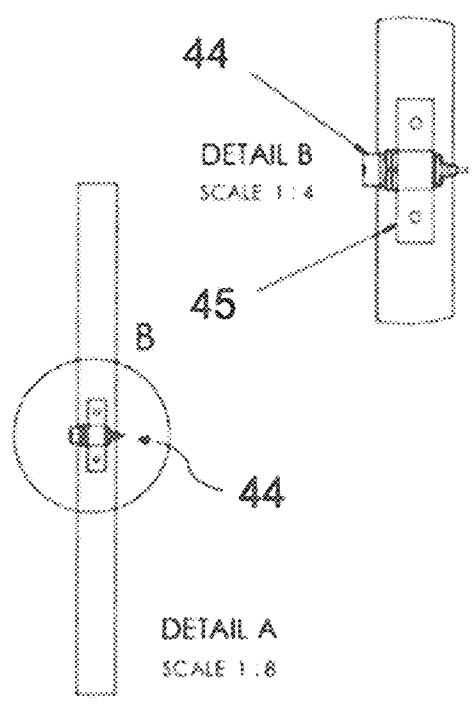
FIG. 21 is a close up of the proximity sensor of FIG. 19.
Figure 22A:
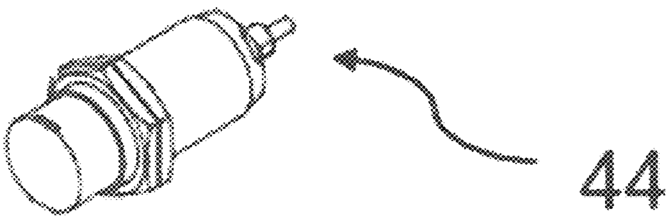
FIGS. 22A, 22B and 22C are perspective, front and side views of the proximity sensor of FIG. 21.
Figure 22B:
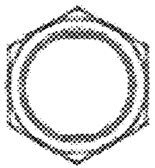
Figure 22C:
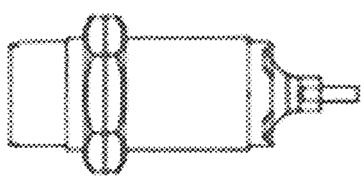

The indicator 13 (preferably a limit switch commercialized by Omron Electronics Inc under the nameEMC Div V-215-1C6) is mounted inside the rail via the opening 19. More specifically, and with reference to FIG. 4 and FIG. 6, the indicator 13 is secured to the rail 11 by way of a support base 12. The support base rests on the two lower side walls of the rail and is secured to the rail using screws. It will be understood that other suitable securing means are contemplated. The support base 12 is preferably in the shape of an inverted triangle (for example, an isosceles or equilateral triangle). The two adjacent sides of the triangle rest on the two inner lower rail side walls. The third side of the triangle support base forms a surface on which the indicator 13 rests or is mounted onto. As shown in FIG. 2 and FIG. 4, the support base 12 comprises two arms 21 extending upwardly therefrom. The pair of support arms is designed to receive the indicator 13. The indicator is secured between the support arms using i.e. socket head screws 16 and locknuts 17. However other suitable securing means are contemplated. As can be seen, the limit switch is electronically connected using wires 15, in this case three wires, which are also placed between the pair of extending arms.

In the exemplary embodiment provided, the indicator is a limit switch that comprises an actuator portion. The actuator portion is in contact with the cover which extends above the upper rail surface by a certain distance or height, e.g. by 2, 5 or 10 mm. For example, the cover can rest on the actuator portion. As shown particularly in FIGS. 4 to 6, when the wheel rolls over the cover 14, the cover is pressed down and in turn the actuator of the indicator 13 is engaged, activated or moved, causing an electrical connection to be made, thereby providing the indication of passage of the wheel over the indicator portion 18. Normally the limit switch is in off mode and is activated when the cover is pressed down. The limit switch can then detect the passage of a wheel over the indicator portion of the rail and for example be used to count the number of passing carts.

In some embodiments the rail comprises a plurality of indicator portions along the length of the rail with an indicator mounted in each of the indicator portions of the rail. For example, for a storing lane comprising three cart slots, three indicators mounted in corresponding rail indicator portions can be provided such that information can be collected on the number of carts that are stored in the storing lane. For push-back storage systems comprising a plurality of storing lanes, each lane may have in its corresponding rail indicator portion an indicator, thus providing real time information and inventory of the entire push-back storage system.

In use, the support base and indicator are secured to one another. The support base and indicator are then slid into the rail through a rail end until they are aligned under the opening of the indicator portion of the rail. The support base and indicator are then secured to the rail using for example screws. Appropriate cabling is used to make the required connections for the indicator. The cover can then placed over the opening of the indicator portion.

In some embodiments, the assembly is retrofitted in an existing push-back storage system. To do so, a section of the rail is defined as the indicator portion and an opening is made using suitable means (e.g. a jigsaw).

Debris accumulating on rails of push-back storage systems can hinder or cause misalignment of the carts and/or premature wearing of wheels. Accordingly, another aspect of the present disclosure relates to rail cleaning assemblies for push back storage systems as well as push-back storage systems comprising cleaning assemblies such as for example brush assemblies.

In this assembly, at least one cleaning element (e.g. a brush) is positioned in front and/or behind a cart wheel such that when the wheel rolls on a rail, debris accumulating thereon can be brushed, swept off or blown away. Preferably a pair of cleaning elements is installed in front and behind the wheel. Eliminating such debris (e.g. particles which may have fallen off carts) may prevent premature damage or wearing of wheels and misalignment of carts, thus improving overall maintenance of push-back storage systems.

Now, with reference to FIGS. 7 to 12, an exemplary brush assembly 20 is shown. The brush assembly comprises a frame 22 configured to be mounted on a wheel 23, for example the wheel axle. The frame 22 in this embodiment is an L-shaped corner beam. A first arm of the beam extends downwardly and is mounted to the wheel axle. The second arm extends perpendicularly from the upper end of the first arm and extends over the wheel. As can be seen particularly in FIG. 9, on the front end and back ends of the second arm, slots 24 are provided for inserting therein a brush base. The brush base can be secured to the frame using any suitable means, such as screws 26 and bolts. The brush bristles extend downwardly and are positioned to engage the rail along the length of the rail 22. In use the brushes sweep any incoming debris and prevent the debris from accumulating on the rail, thus preventing the wheels to roll over debris.

Any suitable brush can be used, for example a nylon brush or a horsehair brush. Preferably, the brush has a width that is at least equivalent to the width of the wheel portion engaging the rail. It will be understood that any suitable cleaning element that creates sufficient friction with the rail to move or lift dust, dirt or debris, may be used. For example a duster may be used instead of a brush.

When the brush shows signs of wearing and needs to be replaced, the user can simply remove the used brush from the frame, without having to dissemble the frame from the wheel. For example, with reference to FIGS. 7 to 12, the user can remove the screws, slide the brush base off the slots and insert a new brush.

In some embodiments, a brush assembly is mounted on each of the cart wheels. In other embodiments, a brush assembly is mounted on some but not all of the cart wheels. In some embodiments, the brush assembly comprises a pair of cleaning elements, e.g. brushes. In other embodiments, the brush assembly comprises one cleaning element, e.g. one brush. In such case, it is desirable that the brush be mounted in the slot closest to the outer extremity of the cart, to ensure optimal sweeping of debris.

In some embodiments, the push-back storage system comprises one or more additional sensors integrated in the system. Such sensors include without limitation proximity sensors, infrared (IR) sensors e.g. IR reflective sensors, color sensors, force sensors and contact sensors. Certain types of sensors may not be optimal for push-back storage systems such as magnetic sensors which may for example interact with metal components of the cart rollingly mounted on the rails.

In an embodiment, the push-back storage system comprises a plurality of sensors described herein.

In one embodiment, with reference to FIGS. 13 to 18, the push-back storage system comprises a reflective sensor (such as Omron product #E3FA-RP21). The push-back storage system 30 comprises a rack structure 31 with frames parallel to the pair of rails. As can be seen, a base pallet 32 is moved along the rails by means of a plurality of wheels 33. The reflective sensor comprises an optic sensor 34 and a reflector 37. The optic sensor and reflector are secured to opposing frame regions, such that every time a cart moves along the rails and crosses the sensor region, a signal is generated. The sensor may for example be used to automize inventory of the storage remaining on the racks without the need of a user or operator being physically present. Information can be transmitted directly to a computer and enhance the manageability of operations. As can be seen, the sensor 34 is connected to an optic cable. The sensor can also be secure to the frame using a sensor bracket 35. The reflector and optic sensor (or optic sensor bracket) may be secured to the frame using suitable techniques. For example screws (e.g. hex head screws) may be suitable.

In another embodiment, with reference to FIGS. 19 to 24, the push-back storage system 40 comprises a proximity sensor 44 (such as Omron #E2B-M30LN30-WP-C1) placed at the rear end of the storing lane. The sensor 44, which is secured to the rack structure 41 is first secured using a bracket 45. When a pallet 42 is moved along the rail length by way of wheels 43, the proximity sensor may be used to determine a particular distance of the cart for example, for example to determine whether the last cart is pushed back all the way back, as well as provide information on the number of pallets.

Figure 25:
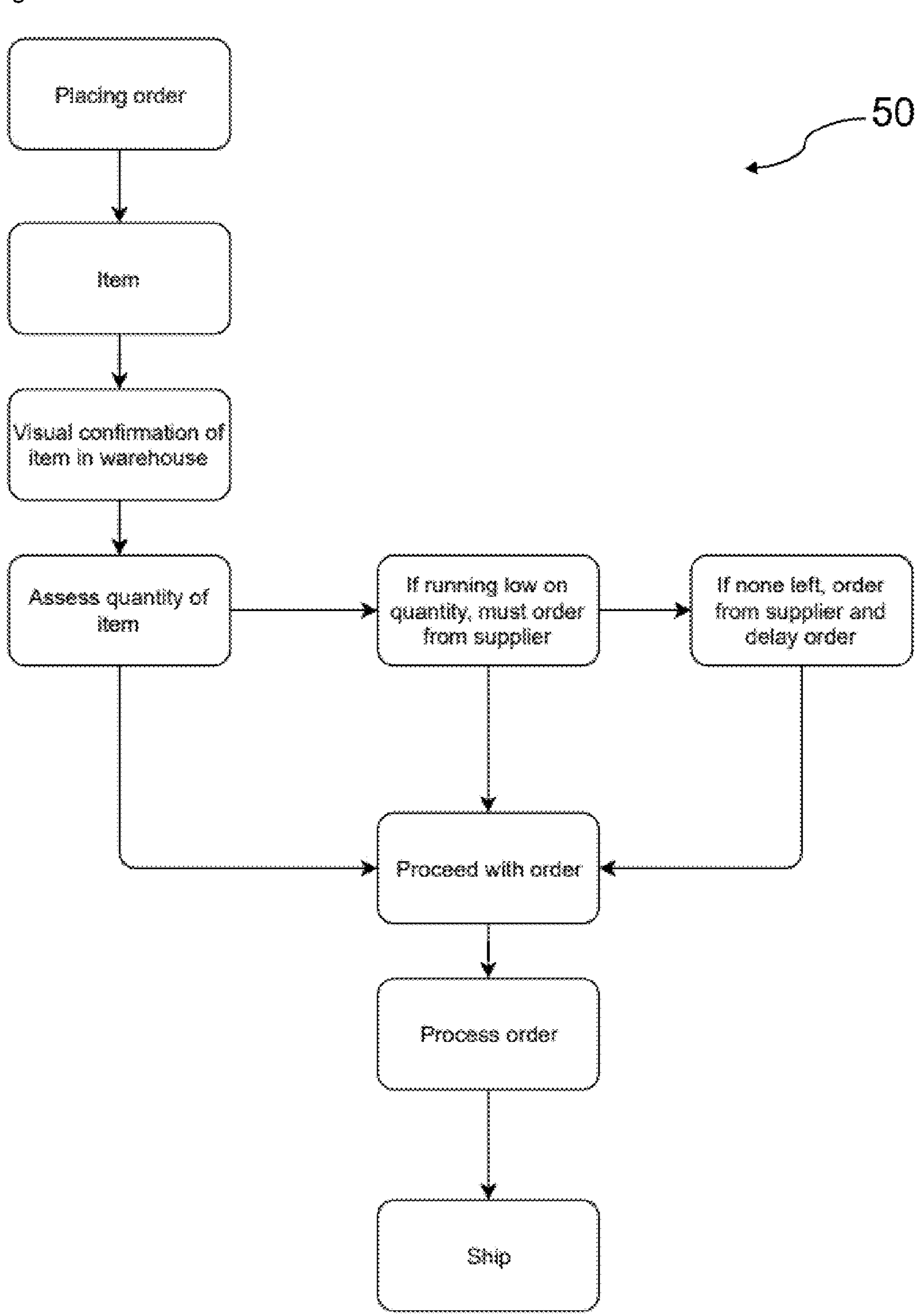
FIG. 25 is a flowchart of the warehouse management system before implementation of sensor assemblies.
Figure 26:
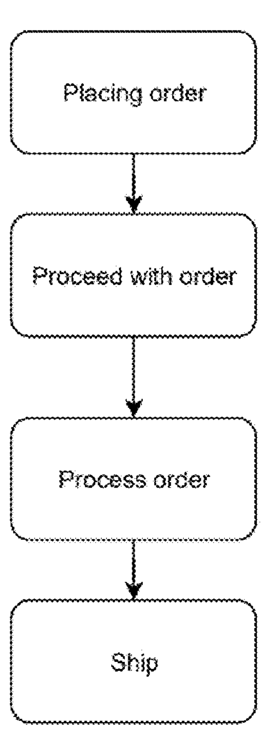
FIG. 26 is a flowchart of the warehouse management system after implementation of sensor assemblies.
Figure 26:
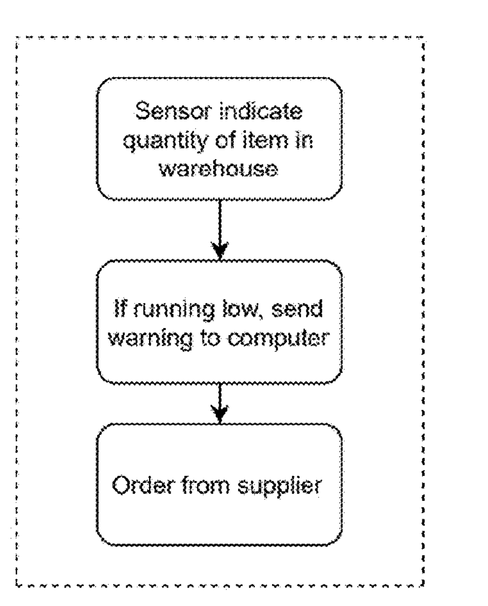

The push-back storage systems herein described may be integrated in warehouse management system (WMS) to improve warehouse functionality. The purpose of WMS is to ensure the movement of goods as well as its efficiency and cost-effectiveness. WMS includes a number of functions such as inventory tracking, picking, receiving and storing of goods, and as such may help supply chain operate as efficiently as possible by ensuring incoming goods in the warehouse are processed at similar pace as orders being fulfilled and shipped out. Accordingly, the implementation of sensors in push-back storage systems may greatly enhance the WMS by providing inventory tracking and fulfillment processes. To illustrate, the flow chart of FIG. 25 describes a warehouse management system in the absence of sensors. When an order is placed, an employee must visually locate the item location. While the employee picks the item in question, an assessment of the quantity of the item will be made and then the order may be proceeded with. While the item is being picked, an assessment by the employer is made and may be provided to the employee's manager. This assessment and providing of information to the manager may be addressed by implementing sensors in the WMS. The presence of sensors may also reduce errors made by the employee in preparing orders. In contrast, the flowchart of FIG. 26 describes a WMS where sensors implemented to provide information on inventor eliminates or reduces the risk of running out not having information on inventory in the warehouse and for example running out of inventor. For instance, a computer placed for example near the entrance of the warehouse, may gather inventory of all items in the rack storages and eliminate the need of employees having to assess the inventory.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A rail cleaning assembly for use in a push-back storage system, comprising:

- a frame configured to be mounted to a cart wheel that rollingly engages a rail along the length of the rail; and
- at least one cleaning element, the at least one cleaning element secured to the frame and positioned to engage the rail, thereby removing debris accumulated on the rail as the wheel rollingly engages the rail,
- wherein the at least one cleaning element comprises a base and a cleaning portion,
- wherein a first arm of the frame extends downwardly and a lower end of the first arm is configured to be mounted to the cart wheel,
- wherein a second arm of the frame extends from the upper end of the first arm and is configured to extend over the cart wheel, and
- wherein the second arm of the frame comprises a front end and a back end and at least one of the front and back ends are configured to receive the base.

2. The rail cleaning assembly of claim 1, wherein the base is secured to the frame and has an extremity extending downwardly and positioned to engage the rail.

3. The rail cleaning assembly of claim 1, wherein the at least one cleaning element is configured to be positioned in front and/or behind the wheel.

4. The rail cleaning assembly of claim 1, comprising a pair of cleaning elements, a first cleaning element configured to be positioned in front of the wheel and a second cleaning element configured to be positioned behind the wheel.

5. The rail cleaning assembly of claim 1, wherein the frame is L-shaped, and the second arm of the frame extends perpendicularly from the upper end of the first arm.

6. The rail cleaning assembly of claim 5, wherein the front and/or back ends comprise a respective slot for insertion therein of the base.

7. The rail cleaning assembly of claim 1, wherein the front and/or back ends comprise a respective slot for insertion therein of the base.

8. A push-back storage system, comprising:

an elongated storing lane defining opposite front and rear ends;

at least one pair of spaced-apart parallel elongated rails extending between said front and rear ends of said storing lane and being inclined downwardly from said rear end towards said front end;

at least one cart rollably carried by said pair of rails and rollable along said pair of rails between said storing lane front and rear ends, said cart comprising a load-bearing frame rollably carrying a number of wheels each engaging a corresponding one of said rails; and a rail cleaning assembly, comprising:

a frame mounted on one of the cart wheels; and at least one cleaning element, the at least one cleaning element secured to the frame and positioned to engage a rail of the at least one pair of rails, thereby removing debris accumulated on the surface of the rail as the wheel rollingly engages the rail, wherein the at least one cleaning element comprises a base and a cleaning portion, wherein a first arm of the frame extends downwardly and a lower end of the first arm is mounted to the one of the cart wheels, wherein a second arm of the frame extends from the upper end of the first arm and extends over the one of the cart wheels, and wherein the second arm of the frame comprises a front end and a back end and at least one of the front and back ends receives the base.

9. The system of claim 8, wherein the base is secured to the frame and has an extremity extending downwardly and positioned to engage the rail.

10. The system of claim 8, comprising a plurality of rail cleaning assemblies, each of the rail cleaning assemblies mounted to a different cart wheel.

11. The system of claim 8, wherein the rail cleaning assembly comprises a pair of the cleaning elements, a first one of the cleaning elements positioned in front of the wheel and a second one of the cleaning elements positioned behind the wheel.

12. The system of claim 8, wherein the frame is L-shaped, and the second arm of the frame extends perpendicularly from the upper end of the first arm.

13. The system of claim 12, wherein the front and/or back ends comprise a respective slot for insertion therein of the base.

14. The system of claim 8, wherein the front and/or back ends comprise a respective slot for insertion therein of the base.

* * * * *